United States Patent [19]

Schleimer

[11] Patent Number: 4,561,637

[45] Date of Patent: Dec. 31, 1985

[54] PROCESS AND APPARATUS FOR HEATING A STEEL BATH CHARGED WITH SCRAP

[75] Inventor: Francois Schleimer, Esch, Luxembourg

[73] Assignee: Arbed S.A., Luxembourg, Luxembourg

[21] Appl. No.: 534,977

[22] Filed: Sep. 23, 1983

[30] Foreign Application Priority Data

Sep. 27, 1982 [LU] Luxembourg .......................... 84390

[51] Int. Cl.$^4$ .............................................. C21B 7/22
[52] U.S. Cl. ..................................... 266/81; 266/155; 266/900; 75/59.17
[58] Field of Search ................... 266/156, 155, 81, 82, 266/216, 901, 266; 75/60, 59

[56] References Cited

U.S. PATENT DOCUMENTS

| | | |
|---|---|---|
| 3,933,343 | 1/1976 | Rawlings ............................ 266/901 |
| 4,040,608 | 8/1977 | Vicard ................................ 266/156 |
| 4,251,270 | 2/1981 | Hoshi et al. ............................. 75/59 |
| 4,264,059 | 4/1981 | Benatar .............................. 266/81 |
| 4,314,694 | 2/1982 | Ueda et al. ............................. 75/60 |
| 4,328,030 | 5/1982 | Tozaki et al. ........................ 266/156 |
| 4,395,166 | 7/1983 | Ulveling ............................. 266/81 |

*Primary Examiner*—L. Dewayne Rutledge
*Assistant Examiner*—S. Kastler
*Attorney, Agent, or Firm*—Fishman & Dionne

[57] ABSTRACT

A process and apparatus for heating a steel bath charged with scrap which efficiently utilizes converter waste gas to supplement external energy sources is presented.

23 Claims, 1 Drawing Figure

PROCESS AND APPARATUS FOR HEATING A STEEL BATH CHARGED WITH SCRAP

BACKGROUND OF THE INVENTION

This invention relates to a new and improved process and apparatus for heating a steel bath charged with large quantities of scrap.

Currently, various processes are well known to those skilled in the art wherein energy required for melting large quantities of scrap is only partially derived from external sources. The necessary energy requirements have been provided by the use of excess internal energy and is most easily obtained when gas or plasma burners or induction or resistance radiators are used. For example, in his U.S. Pat. Nos. 4,349,382; 4,325,730 and 4,345,746, applicant has described how the use of liberated heat derived from afterburning carbon monoxide (CO) during decarburization of steel baths in order to melt larger quantities of scrap has been efficiently utilized. Also, in his Luxembourg Patent LU 83,814, applicant discloses how additional energy capacity may be obtained for a steel bath through selective carburization by an external source.

Despite the successes of the above identified energy efficient processes, problems remain for the steelmaking industry in attempting to utilize converter waste gases in applications other than as a fuel gas to preheat scrap. In particular, a process and apparatus which would permit a steel bath charged with large quantities of scrap to be heated during refining so that the energy present in uncombusted converter waste gases would be efficiently consumed would be extremely useful. A process as described would economically avoid or reduce the use of external energy sources.

SUMMARY OF THE INVENTION

The above discussed and other problems of the prior art are overcome or alleviated by the smelting/refining process and apparatus for heating a steel bath of the present invention. In accordance with the present invention, converter waste gases are removed during the course of the decarburization phase, collected, treated and subsequently compressed. This compressed gas is then charged with a solid fuel (preferably carbon) and blown together with oxygen onto the surface of a steel bath. Thus, the process of the present invention provides a cost saving partial replacement of external energy sources by recycling converter waste gas back into the refining process as a heating gas. This recycling provides a direct utilization of the uncombusted waste gases due to the fact that the waste gases still contain substantial quantities of CO which would otherwise have to be acquired from outside the refining process.

It appears that only the fraction of converter waste gases which is produced in the decarburization of pig iron has a sufficient energy content to be of primary interest for the process of the present invention. Besides CO, this fraction also contains $CO_2$ in proportions which vary according to the afterburning of CO gas as well as drawn-in air. These miscellaneous gas constituents pose a variety of dangers including first, limiting the energy capacity of the gas and second, that the gas will contain an excessive nitrogen concentration. Nitrogen is a particular danger since the solubility of nitrogen increases in steel with temperature. Thus, it is advisable to restrict the nitrogen content of the recycled gas to a minimum.

In a preferred embodiment, solid carbon may be added to the recycled gas as it is blown onto the steel bath in the form of granulated anthracite, coking duff, charcoal, etc. This procedure results in two advantages: first, the bath is carburized depending upon the quantity of carbon with a resultant increase in energy content; and second, volatile components are liberated when the carbon particles strike the bath surface. This second advantage aids in suppressing the nitrogen concentration at the phase boundary. To perform its function as a carrier gas, the recycled gas must be compressed to pressures on the order of 15 bars.

An apparatus suitable for implementing the process of the present invention includes a series of conventional downstream units for cooling, cleaning and drying the waste gas. Thereafter, a collection station receives the converter waste gas which has been produced during the recarburization process and fed through the above-discussed units. Connected to the collecting station is a continuously operating CO content measuring instrument which is coupled to a computer. The computer is responsible for determining the quantity of carbon to be supplied and for controlling a metering device which preferably consists of a conventional cellular wheel feeder. This feeder allows the addition of solids to a feed duct containing gas under pressure. The solids throughput is controlled by regulating the rotational speed of the cellular wheel feeder. The metering device is positioned downstream of the compressor and acts to add carbon to the compressed recycled waste gas. When blowing this solid-gas mix onto the steel bath, it is advisable to employ a special blowing lance which is described by applicant in his Luxembourg Patent LU 84,176 corresponding to U.S. patent application Ser. No. 497,735.

BRIEF DESCRIPTION OF THE DRAWINGS

The single FIGURE of the drawing shows a schematic diagram of the apparatus in accordance with the present invention.

DESCRIPTION OF THE PREFERRED EMBODIMENT

Figure 1:
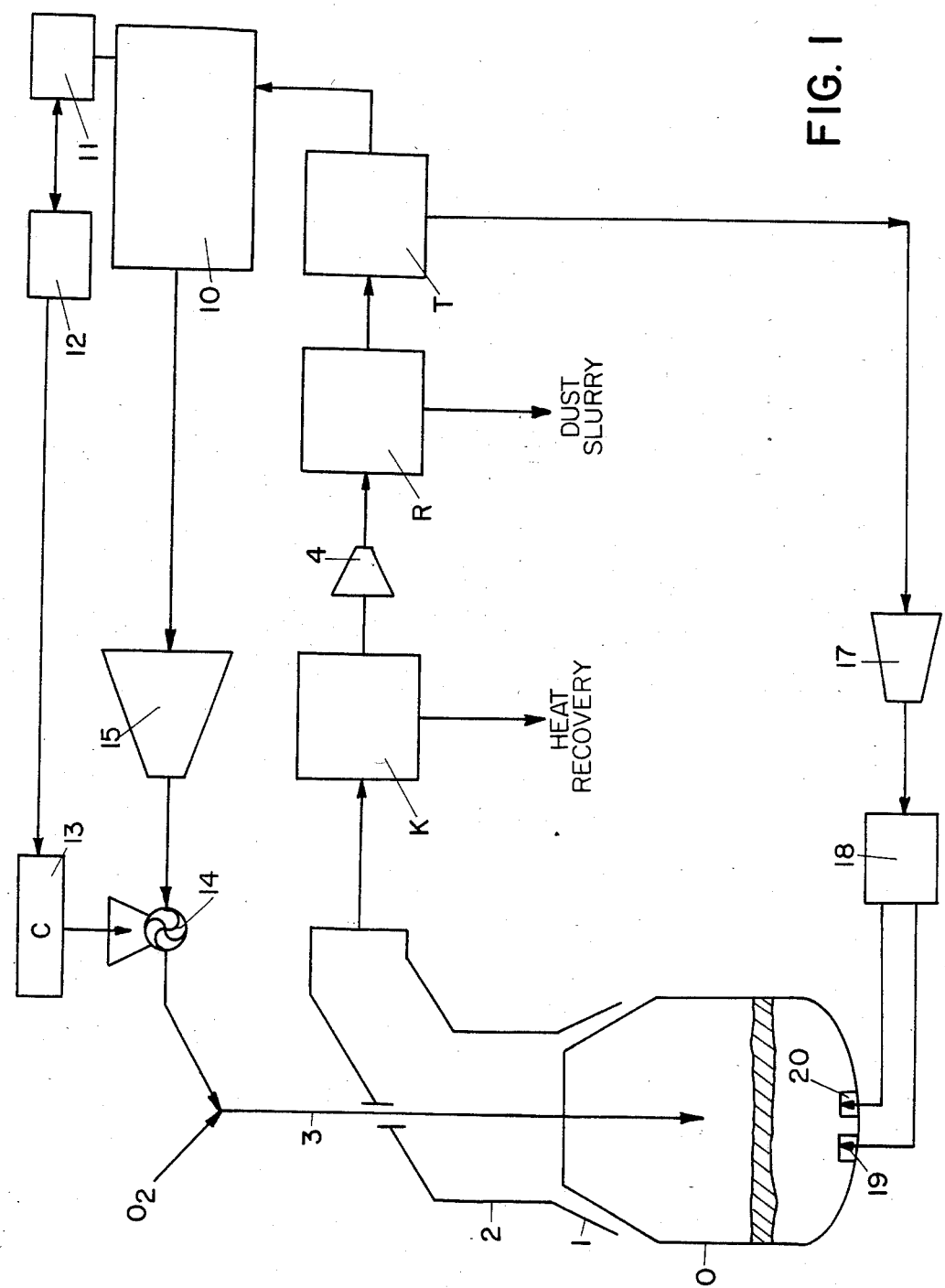

Referring to FIG. 1, the steel mill converter 0 has a lowerable hood 1, which opens into the chimney 2, and through which a blowing lance 3 can be raised or lowered. Connected to the chimney as schematically represented in the order in which waste gas passes through them under the influence of a gas turbine 4, are individual units for cooling (K), cleaning (R), and drying (T) the waste gas. The waste gas then reaches a collecting station 10, to which a CO determining device 11 is attached. This device 11 provides measurement signals to the computer 12, which calculates the energy requirements and the energy availability of the system, as a function of pig iron and scrap quantities, so as to achieve the necessary minimum thermal value for melting the scrap in the converter.

Carbon is injected into the system from the schematically represented carbon delivery unit 13, which is controlled by computer 12. Thus, waste gas passes into compressor 15 and is conducted through a metering device 14, preferably a cellular wheel feeder, whereby metered quantities of carbon are delivered to the waste gas and are supplied to the blowing lance 3. As indicated, oxygen ($O_2$) is also added to the system. Care should be taken to only add the oxygen to the waste gas carbon stream immediately after leaving the lance head, and also to adjust the gas jet so that ignition takes place only 0.5–1 m after emerging from the lance orifice. To this end, a dual flow lance may be employed to deliver separate streams of oxygen and waste gas/carbon through the lance.

An alternative embodiment of the present invention utilizes a combined blowing process with oxygen from above and circulation gas from below for using the converter waste gases for through circulation as well. In this case a portion of the waste gases are conducted directly from the drying station T through a compressor 17 into distribution system 18, and from there are injected through individual gas-permeable elements 19, 20 into the bath. That portion of the gases not diverted into distribution system 18 may continue to circulate according to the previously discussed process.

The present invention permits the use of increased quantities of scrap, with most of the energy required for melting the scrap being supplied by resources within the system, namely, CO in the converter waste gas. Thus, only a relatively small fraction of energy from external sources is required.

The following examples and numerical considerations illustrate the different energy relationships when particular quantities of converter waste gas are recycled.

EXAMPLE

Assume for this example a 180-ton converter equipped with a lowerable hood, where the off-gas combustion factor $\lambda$ is 0.1.

It has been empirically determined that in the course of the waste gas collecting phase, 5,046 $Nm^3$ gas is produced per charge, and that when 3,000 kg of anthracite (carbon) is introduced as an external energy source, the waste gas occupies a volume of 8,621 $Nm^3$. Therefore 3,000 kg anthracite corresponds to an additional volume of 3,575 $Nm^3$ waste gas.

If a certain portion of the external energy source is replaced in accordance with the present invention by recycled waste gas, both these volumes and the amount of available energy will change.

The following definitions are used in the accompanying computations:

X: The portion of anthracite actually introduced in relation to 3,000 kg anthracite.
Q: The portion of recycled waste gas in relation to the total amount of waste gas produced.
EC: The amount of heat available from 3,000 kg introduced carbon.
EG: The amount of heat available from 1 $Nm^3$ recyled waste gas.

This assumes that the energy balance for the case of partial replacement of carbon by recycled waste gas is described as follows:

$$EC = X \cdot EC + Q \cdot EG \ (5046 + 3575 \ X)$$

Consider 1 $Nm^3$ waste gas composed of 0.85 $Nm^3$ CO and 0.15 $Nm^3$ $CO_2$. With a $\lambda$ value of 0.1, the oxygen needed for CO oxidation is $(0.85 \cdot 0.1)/2 = 0.0425 \ Nm^3$, which is accompanied by a ballast of 0.16 $Nm^3$ nitrogen.

The resulting gas contains:
$0.85 \cdot 0.9 = 0.765 \ Nm^3$ CO as well as 0.16 $Nm^3$ $N_2$ and 0.235 $Nm^3$ $CO_2$.

In the following tables, the composition of waste gas produced is computed for cases in which Q assumes the values 0.1, 0.3, 0.5 and 1. Also calculated from each CO content are the quantity EG and, using the above equation, the value of X:

TABLE I

| Q | 0.1 | 0.3 | 0.5 | 1 |
| --- | --- | --- | --- | --- |
| CO (%) | 60.72 | 52.40 | 46.09 | 35.42 |
| $N_2$ (%) | 13.79 | 13.79 | 13.79 | 13.79 |
| $CO_2$ (%) | 25.49 | 33.81 | 40.12 | 50.81 |
| EG (kcal/$Nm^3$) | 1179 | 919 | 721 | 388 |
| X | 0.846 | 0.669 | 0.585 | 0.560 |

This determination of each value of X permits the following table to be prepared:

TABLE II

| Q | 0.1 | 0.3 | 0.5 | 1 |
| --- | --- | --- | --- | --- |
| Carbon (kg) | 2539 | 2008 | 1755 | 1680 |
| Gas combusted ($Nm^3$) | 540 | 2231 | 3569 | 7048 |
| Gas removed ($Nm^3$) | 10162 | 10858 | 11847 | 15222 |
| Thermalcapacity (kcal/$Nm^3$) | 1830 | 1579 | 1389 | 1067 |

It is surprising and unexpected that when only 540 $Nm^3$ waste gas is recycled, 461 kg carbon is saved, while to save approximately 1000 kg carbon, 2,231 $Nm^3$ waste gas must be recycled.

Consequently, recycling converter waste gas back into the converter in accordance with the invention is advantageous in that expensive external energy sources are conserved. Note, however, that according to Table II, as increasing quantities of recycled waste gas are used, the savings of external energy sources do not increase proportionately.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A smelting/refining process for heating in a vessel a steel bath charged with scrap, said charged vessel comprising a first region, the first region comprising the steel bath with scrap charged thereto, and a single second region above the first region, including the steps of:
    removing converter waste gas from said entire second region of said vessel, said waste gas containing CO;
    processing said waste gas;
    compressing said waste gas;
    charging said compressed waste gas with a carbonaceous material; and
    blowing said charged waste gas onto the surface of the bath.

2. A process according to claim 1 wherein said waste gas is compressed to at least 15 bars.

3. A process according to claim 1 including:
    continuously measuring the amount of CO in said collected waste gas; and
    calculating the minimum quantity of carbonaceous material necessary for melting the scrap after a comparison with said measured amount of CO.

4. The process according to claim 3 wherein said calculating is accomplished by a computer.

5. A process according to claim 1 wherein the step of processing includes the steps of:
    cooling said waste gas;

cleaning said waste gas; and
drying said waste gas.

6. The process according to claim 1 including:
supplying oxygen to the surface of the bath.

7. The process according to claim 1 wherein:
the waste gas is removed from the decarburizing phase.

8. A process for heating in a vessel a steel bath charged with scrap including the steps of:
removing waste gas from the vessel;
processing said waste gas;
compressing said waste gas;
charging said compressed waste gas with a carbonaceous material;
blowing said charged waste gas onto the surface of the bath; and
injecting at least a portion of said compressed waste gas into the bath from below, thereby achieving bath agitation.

9. A process according to claim 8 wherein said waste gas contains CO.

10. Apparatus for heating in a vessel a steel bath charged with scrap, said charged vessel comprising a first region, the first region comprising the steel bath with scrap charged thereto, and a single second region above the first region, including:
means for removing converter waste gas from said entire second region of said vessel;
means for processing said waste gas;
means for compressing said processed waste gas;
means for charging said compressed waste gas with a carbonaceous material; and
means for blowing said charged waste gas onto the surface of the bath.

11. Apparatus according to claim 10 wherein means for removing converter waste gas is a gas turbine.

12. Apparatus according to claim 10 wherein said means for charging said waste gas with a carbonaceous material is a metering device.

13. Apparatus according to claim 12 wherein said metering device is a cellular wheel feeder.

14. Apparatus according to claim 10 wherein said blowing means is a blowing lance.

15. Apparatus according to claim 10 wherein said waste gas is compressed to at least 15 bars.

16. Apparatus according to claim 10 wherein said processing means includes:
means for cooling said waste gas;
means for cleaning said cooled waste gas; and
means for drying said cleaned waste gas.

17. Apparatus according to claim 16 including:
means for supplying oxygen to the surface of the bath.

18. Apparatus according to claim 10 including:
means for supplying oxygen to the surface of the bath.

19. Apparatus for heating a steel bath charged with scrap during the smelting/refining of steel including:
means for removing converter waste gas from the decarbonization phase;
means for processing said waste gas;
means for compressing said processed waste gas;
means for charging said compressed waste gas with a carbonaceous material;
means for blowing said charged waste gas onto the surface of the bath; and
means for injecting a portion of said compressed waste gas into the bath from below thereby achieving bath agitation.

20. Apparatus according to claim 19 wherein means for injecting said compressed waste gas from below includes:
a plurality of gas permeable elements located below said bath; and
means to evenly distribute waste gas to said gas permeable elements.

21. Apparatus according to claim 19 wherein said waste gas contains CO.

22. Apparatus according to claim 21 including:
means for continuously measuring the amount of CO in said collected waste gas; and
means for calculating the minimum quantity of carbonaceous material necessary for melting the scrap after a comparison with the measured amount of CO.

23. Apparatus according to claim 22 wherein said means for calculating is a computer.

* * * * *